United States Patent
Boiger et al.

(10) Patent No.: US 10,220,352 B2
(45) Date of Patent: Mar. 5, 2019

(54) WATER SEPARATING DEVICE, FILTER ELEMENT OF A FUEL FILTER AND A FUEL FILTER

(71) Applicant: MANN+HUMMEL GMBH, Ludwigsburg (DE)

(72) Inventors: Gernot Boiger, Winterthur (CH); Martin Veit, Gaertringen (DE); Jochen Reyinger, Waiblingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 14/594,490

(22) Filed: Jan. 12, 2015

(65) Prior Publication Data

US 2015/0122720 A1 May 7, 2015

Related U.S. Application Data (63) Continuation of application No. PCT/EP2013/061549, filed on Jun. 5, 2013.

(30) Foreign Application Priority Data

Jul. 12, 2012 (DE) .................. 10 2012 013 743

(51) Int. Cl.
*F02M 37/22* (2006.01)
*B01D 71/36* (2006.01)
(Continued)

(52) U.S. Cl.
CPC .......... *B01D 71/36* (2013.01); *B01D 17/045* (2013.01); *B01D 17/10* (2013.01); *B01D 29/58* (2013.01);
(Continued)

(58) Field of Classification Search
CPC .............................. B01D 71/36; F02M 37/221
See application file for complete search history.

(56) References Cited

U.S. PATENT DOCUMENTS 2,864,505 A * 12/1958 Kasten .................. C10G 33/06
210/298
3,953,566 A * 4/1976 Gore ...................... B01D 71/36
264/127
(Continued)

FOREIGN PATENT DOCUMENTS

CA 963400 * 2/1975 .......... B01D 17/045
DE 10123190 A1 11/2002
(Continued)

OTHER PUBLICATIONS

EP1256707A2—EPO Machine Translation, 2015, 2 pages.*

*Primary Examiner* — Patrick J Orme
(74) *Attorney, Agent, or Firm* — James Hasselbeck (57) ABSTRACT

A water separating device of a filter element for separating water from a liquid hydrocarbon has a coalescing medium in the from of a hollow body and designed to coalesce water droplets of the liquid hydrocarbon passing through the coalescing medium in a flow direction of the liquid hydrocarbon. A hydrophobic separating medium in the form of a hollow body and permeable for the liquid hydrocarbon is provided. The hydrophobic separating medium is arranged in a flow direction of the liquid hydrocarbon downstream of the coalescing medium and separates water droplets of the liquid hydrocarbon from the liquid hydrocarbon. At least one precipitation gap is formed between the coalescing medium and the separating medium.

15 Claims, 3 Drawing Sheets

(51) Int. Cl.
  *B01D 17/04*   (2006.01)
  *B01D 17/00*   (2006.01)
  *B01D 36/00*   (2006.01)
  *C10G 33/06*   (2006.01)
  *B01D 29/58*   (2006.01)
  *B01D 63/14*   (2006.01)
(52) U.S. Cl.
  CPC .......... *B01D 36/003* (2013.01); *B01D 63/14* (2013.01); *C10G 33/06* (2013.01); *F02M 37/221* (2013.01)

(56) References Cited

U.S. PATENT DOCUMENTS

| | | | | |
|---|---|---|---|---|
| 4,253,954 | A | * | 3/1981 | Midkiff ................ B01D 17/045 210/315 |
| 4,588,500 | A | * | 5/1986 | Sprenger ............ B01D 17/0202 210/100 |
| 4,995,974 | A | | 2/1991 | Lorey |
| 2008/0105629 | A1 | * | 5/2008 | Yang ...................... C10G 33/06 210/799 |

FOREIGN PATENT DOCUMENTS

| | | | | |
|---|---|---|---|---|
| EP | 1256707 | A2 | * 11/2002 | ........... B01D 36/003 |
| GB | 2138693 | A1 | 10/1984 | |

\* cited by examiner

WATER SEPARATING DEVICE, FILTER ELEMENT OF A FUEL FILTER AND A FUEL FILTER

CROSS-REFERENCE TO RELATED APPLICATIONS

This application is a continuation application of international application No. PCT/EP2013/061549 having an international filing date of Jun. 5, 2013 and designating the United States, the international application claiming a priority date of Jul. 12, 2012, based on prior filed German patent application No. 10 2012 013 743.5, the entire contents of the aforesaid international application and the aforesaid German patent application being incorporated herein by reference.

BACKGROUND OF THE INVENTION

The invention concerns a water separating device, in particular of a filter element, in particular of a fuel filter of an internal combustion engine, in particular of a motor vehicle, for separating water from a liquid hydrocarbon, in particular fuel or oil, which comprises a coalescing medium, designed as a hollow body, for coalescing water droplets from the liquid hydrocarbon and further comprises, in flow direction of the liquid hydrocarbon downstream of the coalescing medium and, for example, in its interior or surrounding it, a hydrophobic separating medium, designed as a hollow body and permeable for the liquid hydrocarbon, for separating water droplets contained within the liquid hydrocarbon.

Moreover, the invention concerns a filter element of a fuel filter of an internal combustion engine, in particular of a motor vehicle, comprising a water separating device for filtering a liquid fuel and for separating water from the fuel.

Moreover, the invention concerns a fuel filter of an internal combustion engine, in particular of a motor vehicle, comprising a housing comprising at least one fuel inlet for the fuel to be purified, at least one fuel outlet for purified fuel, and at least one water outlet for water separated from the fuel.

US 2008/0105629 A1 discloses a water/fuel separating system for removal of water from a liquid hydrocarbon. The water/fuel separating system comprises a filter housing and a separating section which is arranged in the filter housing. At the separating section, water droplets contained in the hydrocarbon are retained and separated.

It is the object of the invention to design a water separating device, a filter element, and a fuel filter of the aforementioned kind with which a separation of water from liquid hydrocarbons can be improved. Moreover, a pressure difference between an inlet side of the liquid hydrocarbon into the water separating device and an outlet side is to be preferably reduced.

SUMMARY OF THE INVENTION

This object is solved according to the invention in that at least one precipitation gap is realized between the coalescing medium and the separating medium.

According to the invention, the water separating device is of a multi-stage configuration so that the separation of water is improved. The coalescing medium is arranged upstream of the separating medium, at a spacing therefrom, in the flow direction. Upon passage therethrough, even smallest water droplets which are contained in the liquid hydrocarbon can be separated at the coalescing medium and combined to larger water droplets. Large water drops can be precipitated in the precipitation gap in the flow direction of the liquid hydrocarbons downstream of the coalescing medium. Water drops which together with the liquid hydrocarbon reach the precipitation gap and have not yet precipitated thereat are retained at the separating medium. In the precipitation gap, the water droplets sink downward due to their specific weight. When the specific weight of the hydrocarbon is greater than that of water, the water drops rise up in analogy. In this case, the water separating device can be arranged upside down. Advantageously, in the usual mounted position of the water separating device, the precipitation gap can be oriented vertically so that the water drops can leave the precipitation gap as unimpeded as possible.

Advantageously, the water can be collected in particular in a water collecting chamber which is connected to a water outlet of a housing in which the water separating device is located.

Advantageously, the coalescing medium and the separating medium can be arranged coaxially. In this way, a uniform extension of the precipitation gap in the circumferential direction can be enabled. In this way, a flow of the liquid hydrocarbon can be improved, in particular made more uniform. In this way, moreover the pressure conditions within the water separating device can be improved. In particular, a pressure difference between an inlet side and an outlet side of the water separating device can be reduced. For example, the separating medium, in case of a star-folded coalescing medium, can also be resting at the fold ridges so that in the fold pockets of the coalescing medium a precipitation gap Is formed. Accordingly, this provides in circumferential direction several precipitation gaps or a precipitation gap that is interrupted in the circumferential direction partially by the fold ridges.

Because of the separate arrangement, the coalescing medium and the separating medium can be optimized with regard to their respective function. Since even smallest water droplets are already combined by the coalescing medium and may become larger water drops, the through openings in the separating medium can be correspondingly larger. In this way, pressure loss at the separating medium can be reduced. When advantageously the coalescing medium is flowed through from the interior to the exterior in radial direction, the separating medium can be located outside of the coalescing medium and surround it. When advantageously the coalescing medium is flowed through alternatively in radial direction from the exterior to the interior, the separating medium can be located within an interior of the coalescing medium.

In an advantageous embodiment, the separating medium can comprise polytetrafluoroethylene, in particular in the form of a porous medium layer of polytetrafluoroethylene which preferably is expanded polytetrafluoroethylene, wherein the porous medium layer especially forms a film and/or a membrane. The film-type separating medium can also be referred to as membrane. Expanded polytetrafluoroethylene (ePTFE) has water-repellent properties. ePTFE is an especially processed form of polytetrafluoroethylene. During processing to ePTFE, the PTFE molecule fibers are oriented so that improved strength and cold flow properties are produced in the material in comparison to non-oriented PTFE. At the inflow side of the ePTFE film, the water drops that have not been separated in the upstream separating stages can run off and fall down vertically as a result of gravity. An ePTFE film has a greater water-repellent effect than conventional hydrophobic fabrics. An ePTFE film, as a result of the oriented molecule fibers, can be furnished with a high strength and chemical resistance. A film can be closed simply in circumferential direction so that the entire precipitation gap can be circumferentially delimited by it. The ePTFE can be a mono-directional ePTFE in which the molecule fibers are oriented in one direction. Alternatively, a multi-directional ePTFE can be provided in which the molecule fibers are oriented in different direction. By means of multi-directional ePTFE a higher strength and creeping resistance in longitudinal and transverse directions of the film or membrane can be achieved as compared to monodirectional ePTFE.

Advantageously, through openings for the liquid hydrocarbon in the separating medium can have diameters in a range of approximately between 0.1 μm and 30 μm in order to obtain an effective water separation. The through openings, in particular in case of an ePTFE film, can also be referred to as pores or slots. It has been found that diameters or widths in a range of between approximately 5 μm and approximately 20 μm improve a relation between a separating degree of water from the liquid hydrocarbon and a pressure difference between the inlet side and the outlet side of the separating device. This advantage results in particular due to the upstream coalescing medium which has, for example, through openings or pore diameters in the range of between 1 μm and 300 μm wherein preferably proportions of small pores as well as of larger pores should be present in order to achieve an efficient coalescing action.

In a further advantageous embodiment, a shape-stabilizing support body can be provided which can support and/or carry the separating medium and may have through openings for the liquid hydrocarbon. The support body is advantageously embodied as a support layer, preferably in the form of a support lattice, that is connected areally with the separating medium. In this way, the separating medium itself can be made of a material that is not shape-stable. By means of the support body, a shape variety of the separating medium can be enlarged. Advantageously, the separating medium can be folded or bent together with the support body and, in this way, the separating medium can be stabilized in the folded shape. Folding of an ePTFE film in combination with the support body can be realized with better dimensional stability compared to a corresponding folding of other hydrophobic fabrics known in the prior art.

By separation of separating function and of support function/shape-imparting function, the focus in regard to the separating medium can be directed to an improvement of the separating efficiency and a reduction of the pressure difference between the inflow side and outflow side. Its own mechanical shape stability must not be taken into consideration.

The through openings of the support body can be selected appropriately large for reducing the pressure difference. Advantageously, the through openings in the support body can be larger than the through openings in the separating medium. In this way, the liquid hydrocarbons can flow through the support body without this having a significant effect on the flow, in particular the pressure loss. Therefore, as a whole, the pressure loss in the water separating device can be reduced.

The support body can advantageously be arranged on the outflow side of the separating medium. In this way, the support body can support the separating medium better in a direction against the flow direction. The support body can however be arranged also on the inflow side of the separating medium. The separating medium can also be clamped between webs of the support body and thereby cover its through openings. The separating medium, as a film or membrane, can advantageously be placed onto or stretched across an appropriate circumferential side of the support body. Advantageously, the support body can be made of a material, in particular a synthetic material, which is resistant to the liquid hydrocarbon, in particular fuel, preferably diesel fuel. Advantageously, the support body can be made of a plastic material, in particular polyacrylate or a polyethylene. Alternatively, it can also be comprised of organic, in particular cellulose-based, materials. It may also be a mixed material. The support body can advantageously be designed of a skeleton-type configuration or lattice-type configuration. It can advantageously be made of a nonwoven produced by a meltblown method, of spunbonded nonwoven, woven fabric, knit fabric or nonwoven produced in other ways.

Advantageously, the through openings of the support body can have diameters of approximately between 100 μm to 15 mm. It has been found that in case of through openings of the support body with diameters between 100 μm and 15 mm the support function of the support body for the separating medium can be improved and a pressure loss between inflow side and outflow side of the support body can be reduced. Through openings with such diameters can further reduce an effect of the support body on a flow of the liquid hydrocarbon. The diameters of the through openings can also be referred to as mesh width, in particular in case of a lattice-type support body.

In a further advantageous embodiment, the separating medium can have an alternating course in circumferential direction, in particular the separating medium can extend corrugated or zigzag-shaped. Advantageously, a film-type or membrane-type separating medium can be shaped or folded correspondingly. Advantageously, the film-type or membrane-type separating medium can be applied or fitted onto a shape-imparting support body and can be shaped and circumferentially closed subsequently together with the support body. Advantageously, the separating medium can be folded in a zigzag shape together with the support body and circumferentially closed. The separating medium with the support body has than a star-shaped profile. Due to the alternating course of the circumferential side of the separating medium, a surface area of the separating medium to be flowed through can be enlarged for the same spatial requirement, in particular for comparable outer dimensions. By enlarging the inflow surface area, a mechanical surface loading upon flow through the separating medium can be reduced. Due to the enlargement of the inflow surface area in comparison to a circular cylindrical separating medium, the specific discharge of liquid hydrocarbon through the separating medium, the flow rate, and the pressure loss at the separating medium can be reduced. Advantageously, the separating medium can have a higher degree of water-repellent action and thus a smaller water permeability, without a pressure difference between the inflow side and the outflow side being necessarily enlarged thereby. In an alternative advantageous embodiment, the separating medium can also have circumferentially a cylindrical course instead of an alternating course. The cylindrical separating medium can have a round, oval or angular base surface.

In a further advantageous embodiment, a filter medium embodied as a hollow body for filtration of the liquid hydrocarbon can be arranged in flow direction of the liquid hydrocarbons upstream of the separating medium, surrounding it or in its interior. With the filter medium in particular particles which contaminate the liquid hydrocarbon can be filtered out before they reach the separating medium. In this way, the separating medium can be protected. The service life of the separating medium can thus be extended.

Advantageously, the filter medium in flow direction can be arranged upstream of the coalescing medium so that the particles can be filtered out before they reach the coalescing medium. In this way, the coalescing medium can also be protected from particles and its service life can be extended. Alternatively or additionally, the properties of the coalescing medium can be advantageously integrated into the filter medium. Advantageously, in this way, the filtering function as well as the coalescing function can be enabled by means of a single medium.

Advantageously, the water separating device can be arranged exchangeably in a housing. This has the advantage that the separating device can be removed from the housing, if needed, together with the filter medium, in particular for maintenance purposes, in particular in case of soiling. Alternatively, the water separating device can be arranged fixedly in the housing, optionally together with the filter medium. In this case, in particular for maintenance purposes, the complete housing with the water separating device, optionally with the filter medium, can be exchanged.

The object is further solved by the filter element according to the invention that comprises a coalescing medium, designed as a hollow body, for coalescing water droplets from the fuel and further comprises, in flow direction of the fuel downstream of the coalescing medium in its interior or surrounding it, a hydrophobic separating medium, designed as a hollow body and permeable for fuel, for separating water droplets contained in the fuel, wherein a filter medium, designed as a hollow body, for filtration of the fuel is arranged in flow direction of the liquid hydrocarbon upstream of the separating medium, surrounding it or in its interior, and a precipitation gap is realized between the coalescing medium and the separating medium. All advantages and features that have been disclosed in connection with the separating device according to the invention and its advantageous embodiments apply likewise to the filter element according to the invention and its advantageous embodiments.

The object is furthermore solved by the fuel filter according to the invention in which a filter element according to the invention with a water separating device is arranged in such a way in the housing that it separates seal-tightly the fuel inlet from the fuel outlet. All advantages and features disclosed in connection with the separating device according to the invention and the filter element according to the invention and their advantageous embodiments apply likewise to the fuel filter according to the invention and its advantageous embodiments.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims also expediently individually and combine them to other meaningful combinations.

In the Figures, same components are identified with same reference characters.

DESCRIPTION OF PREFERRED EMBODIMENTS

Figure 3:
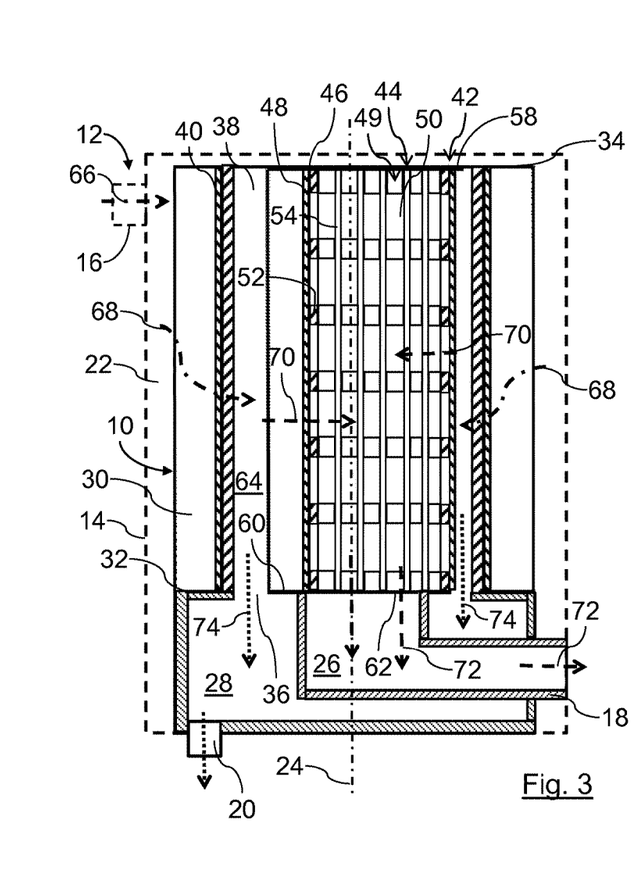
FIG. 3 is a longitudinal section view of the filter element of FIGS. 1 and 2 along a section line III-III of FIG. 2 in a filter housing of the fuel filter.

In the FIGS. 1 to 6, a filter element 10 of the fuel filter 12, shown in a section view in FIG. 3, for diesel fuel of an internal combustion engine of a motor vehicle is shown in different perspectives. The filter element 10 and the fuel filter 12 are illustrated in FIGS. 1 to 6 only schematically and not true to scale. A few elements are only indicated schematically or omitted for better clarity of the illustration.

The filter element 10, as shown in FIG. 3, is arranged in a housing 14 of the fuel filter 12. The housing 14 is indicated in dashed lines. The housing 14 has a fuel inlet 16 for diesel fuel. A fuel outlet 18, which in the present embodiment is arranged in an exemplary fashion on the filter element 10, passes through the circumferential wall of the filter housing 14 out of the latter. A water outlet 20 for water which is separated from the diesel fuel by means of the filter element 10 extends through a bottom of the housing 14 out of the latter. In the present embodiment, the water outlet 20 is arranged in an exemplary fashion on the filter element 10. The filter element 10 is arranged in such a way in the housing 14 that it seal-tightly separates the fuel inlet 16 from the fuel outlet 18.

Figure 1:
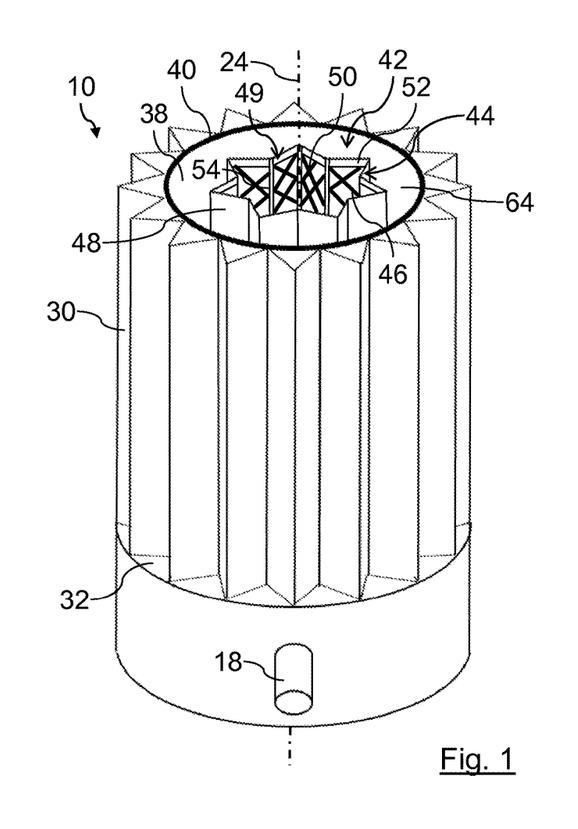
FIG. 1 shows an isometric illustration of a filter element of a fuel filter of an internal combustion engine that is open at its topside, comprising a water separating device that comprises a separating unit with a star-shaped profile.
Figure 2:
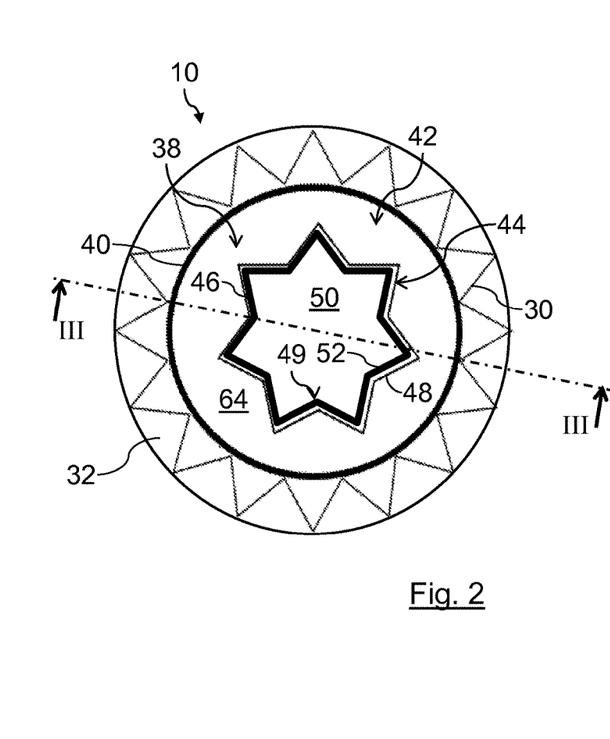
FIG. 2 is a plan view of the filter element of FIG. 1 axially to a longitudinal center axis of the filter element.
Figure 6:
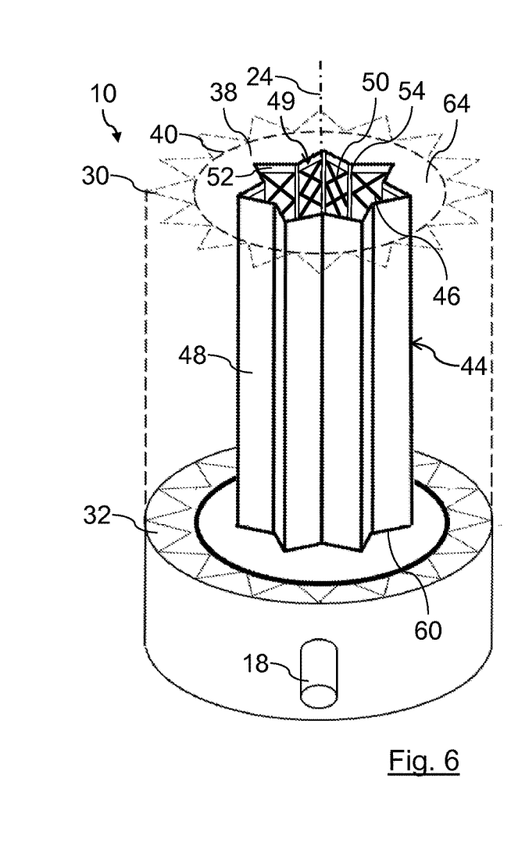
FIG. 6 is an isometric illustration of the filter element of FIGS. 1 to 3, wherein here a radial outer filter element is shown transparent and is indicated with dashed lines.

The fuel inlet 16 is connected outside of the housing 14 with a fuel supply line that is not illustrated in the Figures. In the interior of the housing 14, the fuel inlet 16 opens into an inlet chamber 22 which surrounds in an annular shape the filter element 10 externally in radial direction. The inlet chamber 22 extends in the interior of the housing 14 in axial direction. "Axial", "radial", "coaxial", and "circumferential" relate in the following, if not indicated otherwise, to the filter axis 24 which is indicated in FIGS. 1, 3 and 6 in a dash-dotted line.

The fuel outlet 18 is connected to an outflow chamber 26 which is located in normal mounted position of the fuel filter 12 at the bottom end of the filter element 10. Outside of the housing 14, the fuel outlet 18 is connected to a fuel discharge line, not illustrated in the Figures, for the purified diesel fuel.

The water outlet 20 is connected to a water collecting chamber 28 which, in normal mounted position of the fuel filter 12, is located at the bottom end of the filter element 10. Outside of the housing 14, the water outlet 20 is connected to a water drainage line, not illustrated, by means of which the separated water can be drained from the housing 14.

The filter element 10 comprises a star-shape folded, circumferentially closed filter medium 30 with which in particular particles can be filtered out of the diesel fuel to be purified. The filter medium 30 has an imaginary radial outer envelope and an imaginary radial inner envelope, each in the form of a coaxial circular cylinder. At a lower end face which is facing the bottom of the housing 14, the filter medium 30 is connected seal-tightly to a lower end disk 32. At its oppositely positioned end face, the filter medium 30 is seal-tightly connected to an upper end disk 34 which is illustrated in FIG. 3. The upper end disk 34 is of a continuous closed configuration. The lower end disk 32 has a coaxial opening 36 which connects a filter interior 38 within the filter medium 30 to the water collecting chamber 28.

A coalescing medium 40 is resting on the radial inner fold edges of the filter medium 30. The coalescing medium 40 is circular cylindrical and closed circumferentially. It extends coaxially to the filter medium 30 between the upper connecting end disk 34 and the lower connecting end disk 32. The coalescing medium 40 serves for combining even smallest water droplets within the diesel fuel to larger water drops. The coalescing medium 40 can be a nonwoven, for example. The coalescing medium 40 is part of a water separating device, identified as a whole by 42, for separating water contained in the diesel fuel.

Figure 4:
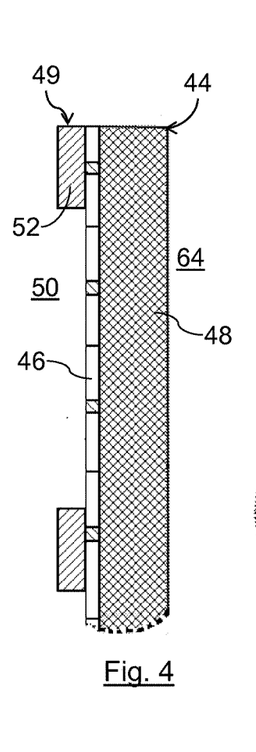
FIG. 4 is a detail section view of the separating unit of the filter element of FIGS. 1 to 3.
Figure 5:
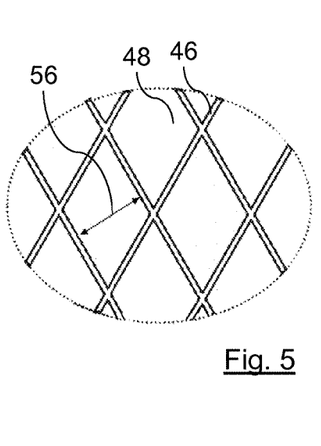
FIG. 5 is a detail view of an outflow side of the separating unit of FIGS. 1 to 4.

The water separating device 42 comprises moreover a separating unit 44 that is embodied as an approximately tubular hollow body. A detail section view of the circumferential wall of the separating unit 44 is illustrated in FIG. 4. In FIG. 5, a plan view onto a radial inner outflow side of the separating unit 44 is illustrated. The separating unit 44 comprises a support lattice 46, arranged in radial direction inwardly, and a separating medium 48, arranged in radial direction outwardly. The support lattice 46 is located at the outflow side of the separating medium 48. An interior 50 of the separating unit 44 in normal mounted position of the fuel filter 12 is connected to the outflow chamber 26 at the bottom end at the end face of the separating unit 44.

The support lattice 46 is made of a material that is resistant to diesel fuel. Preferably, it is polyacrylate or polyethylene. The support lattice 46 is of a mesh-like configuration. It can have preferably a mesh width of approximately 100 µm to 15 mm. The mesh width is indicated in FIG. 5 by a double arrow 56.

The separating medium 48 is made of a hydrophobic material. It is realized as a membrane of expanded polytetrafluoroethylene (ePTFE). The membrane is circumferentially closed. The separating medium 48 serves as a water barrier which allows only diesel fuel to pass through. The ePTFE can be a mono-directional ePTFE in which the molecule fibers are oriented in one direction. Alternatively, it can also be a multi-directional ePTFE in which the molecule fibers are oriented in different directions. By means of multi-directional ePTFE a higher strength and creeping resistance in longitudinal direction and in transverse direction of the membrane can be achieved in comparison to mono-directional ePTFE. The separating medium 48 has a pore size of approximately between 10 µm and 30 µm. The mesh width 56 of the support lattice 46 is significantly larger than the pore size of the separating medium 48. In this way, an influence of the support lattice 46 onto the fuel flow through the separating unit 44 is reduced.

The separating medium 48 surrounds circumferentially the support lattice 46 and is resting with its radial inner side on the support lattice 46. For producing the separating unit 44, the membrane of the separating medium 48 is arranged on the future inflow side of the initially flat support lattice 44. Subsequently, the support lattice 46 together with the separating medium 48 is folded to a star shape and circumferentially closed. In this way, the separating medium 48, which by itself is labile in its shape, can be folded in a simple way to a star shape.

The support lattice 46 with the coalescing medium 40 is pushed onto a separating unit support tube 49. The separating unit support tube 49 has a plurality of circumferentially extending circumferential support sections 52 which are star-shaped in profile. The circumferential support sections 52 are connected to each other by means of a plurality of axial support sections 54. The axial support sections 54 extend axially relative to the filter axis 24.

At the upper end face which is facing away from the outflow chamber 26, the separating unit 44 is closed off seal-tightly with an upper closed separating end disk 58. Here, the separating unit support tube 49, the support lattice 46, and the separating medium 48 are connected to the upper separating end disk 58. On the oppositely positioned end face of the separating unit 44, the separating unit support tube 49, the support lattice 46, and the separating medium 48 are connected to the lower separating end disk 60.

The lower separating end disk 60 has an opening 62 that is coaxial relative to the filter axis 24 and connects the interior 50 of the separating unit 44 to the outflow chamber 26. The separating unit 44 extends in axial direction across the entire filter interior 38.

Between the separating medium 48 and the coalescing medium 40 there is a precipitation gap 64. The precipitation gap 64 has the shape of an annular space. The precipitation gap 64 is delimited radial inwardly by the separating medium 48 and radial outwardly by the coalescing medium 40. At the end face which is facing away from the water collecting chamber 28, the precipitation gap 64 is closed off by the upper end disk 34. At the oppositely positioned end face, the precipitation gap 64 is connected via the opening 36 to the water collecting chamber 28.

In operation of the fuel filter 12, the diesel fuel to be purified, which contains particles and water, is supplied from the fuel supply line through the fuel inlet 16 to the inlet chamber 22, as indicated in FIG. 3 by the dash-dotted arrow 66. From here, the diesel fuel, indicated by arrows 68, passes through the filter medium 30 from the radial exterior to the radial interior to the coalescing medium 40. In doing so, the particles are removed from the diesel fuel. The filter medium 30 forms a first stage of the fuel filter 12 that, as a whole, is of a three-stage configuration for purification/water separation.

At the clean side of the filter medium 30, the diesel fuel from which the particles have been removed passes through the coalescing medium 40 from the radial exterior to the radial interior. In doing so, even smallest water droplets contained in the diesel fuel are caught and combined to larger water drops. The coalescing medium 40 forms a second stage for purification/water separation.

The diesel fuel and the water, which is mostly present in the form of large water drops, reach the precipitation gap 64.

The diesel fuel passes through the separating medium 48, which is a third stage for purification/water separation, from the radial exterior to the radial interior, indicated by dashed arrows 70. Due to the star-shaped arrangement of the separating medium 48, an appropriate enlargement of the flow-through surface area is achieved. Due to the larger flow-through surface area in comparison to a circular cylindrical separating medium, a pressure difference between the inflow side and the outflow side of the separating medium 48 is reduced.

The diesel fuel that has been purified and from which water has been removed passes, as indicated by arrows 72, from the interior 50 of the separating unit 44 downward into the outflow chamber 26 and from there through the fuel outlet 18 into the fuel discharge line.

The water drops, on the other hand, are retained by the separating medium 48. Due to their greater specific weight in comparison to diesel fuel, they sink downward within the precipitation gap 64, indicated by dotted arrows 74, into the water collecting chamber 28. From the water collecting chamber 28 the collected water is drained in a way not of interest in this context into the water drainage line via the water outlet 20.

For maintenance purposes, the housing 14 can be designed such that it can be opened. In this way, the filter element 10 can be removed from the housing 14, for example, for exchanging or for cleaning. The fuel filter 12 can also be designed such that the filter element is fixedly arranged in the housing 14. In this case, the entire fuel filter 12 can be exchanged for maintenance purposes.

Figure 7:
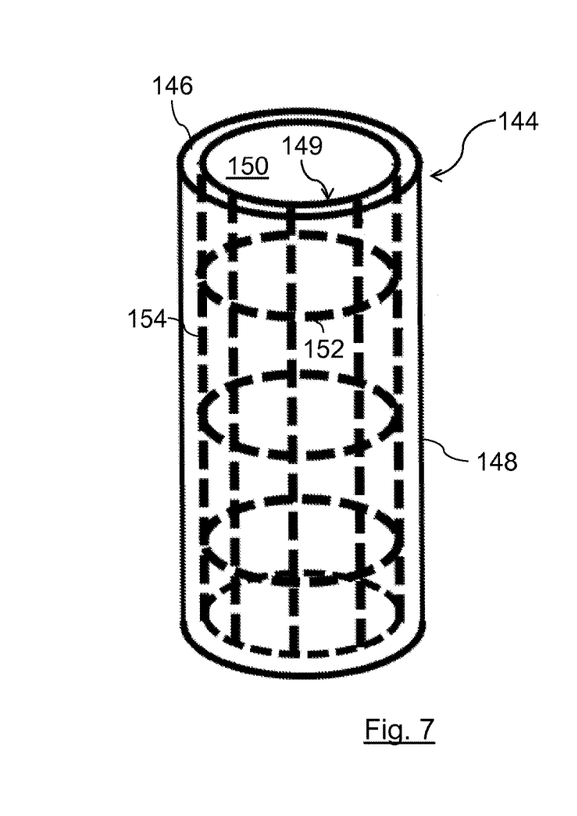
FIG. 7 shows a second embodiment of a circular cylindrical separating unit which can be used in combination with the filter element of FIGS. 1 to 3.

In FIG. 7, a second embodiment of a separating unit 144 is illustrated. Those elements that are similar to those of the first embodiment of FIGS. 1 to 6 are identified with the same reference character plus 100. The second embodiment differs from the first embodiment in that the separating unit 144 and the separating unit support tube 149 do not have a star-shaped but a round profile. The separating unit 144 can be used in analogy to the first embodiment in the filter element 10 of the fuel filter 12 of FIGS. 1 to 6.

In all of the above described embodiments of a filter element 10, a water separating device 42, and a fuel filter 12, the following modifications are possible inter alia.

The invention is not limited to filter elements 10 for diesel fuel. Instead, it can also be used for purification and/or water separation of other types of liquid hydrocarbons, for example, fuels or oils. When a hydrocarbon is used whose specific weight is greater than water, the water droplets rise up in analogy. In this case, the filter element can be arranged upside down. Also, the fuel inlet 16, the fuel outlet 18, and the water outlet 20 can be arranged accordingly.

The invention can also be used for different types of internal combustion engines, for example, industrial motors.

Moreover, the water separating device 42, instead of being integrated in the filter element 10, can also be arranged as a separate component, in particular in its own housing.

The fuel outlet 18 and/or the water outlet 20 can also be connected fixedly with the housing 14, instead of being arranged at the filter element 10.

The arrangement of the filter element 10 in the housing 14 can also be done in a different way. For example, a central tube fixed to the housing can be provided onto which the filter element 10 can be pushed axially relative to the filter axis 24.

Moreover, the filter medium 30 can also be surrounded in radial direction externally by a fluid-permeable coaxial filter support tube which can stably connect the upper end disk 34 to the lower end disk 32. The filter support tube can also be arranged in radial direction inwardly. The coalescing medium 40 can then rest on the radial outer circumferential side of the filter support tube.

The coalescing medium 40, instead of being a nonwoven, can also be realized in another way, for example, as a woven fabric or knit fabric. The coalescing medium 40 can also be combined with the filter medium 30, for example, in the form of a coating. The filter medium 30 can also be provided with a property that effects a coalescing action.

In the first embodiment, the separating medium 48, instead of being folded in a star shape, can also be formed as a different type of hollow body such that it has in circumferential direction an alternating course. For example, a corrugated course about the circumference can be provided. Also, instead of an imaginary circular cylindrical envelope also an imaginary envelope with a different, for example, an oval or angular, base surface can be provided. The separating medium 48 can also be conical in axial direction.

In the second embodiment, the separating medium 148, instead of being circular cylindrical, can also be realized as a different type of hollow body, for example, a hollow cone. Instead of a round base surface, the hollow body can also have a different type of base surface, for example, an oval or angular one.

The support lattice 46, 146, instead of being made of polyacrylate or polyethylene, can also be made of a different type of material that is fuel-resistant, in particular a plastic material.

The filter medium 30, instead of being folded in a star shape, can also be realized as a different type of hollow body, for example, as a hollow cylinder or a hollow cone, for example, with a round, oval or angular base surface.

The separating unit support tube 49, 149, instead of having a profile which corresponds to that of the separating medium 48, 148 with the support lattice 46, 146, can also have a different type of profile. For example, the separating unit support tube 49, 149 can have a round, oval or angular profile. In the first embodiment, also radial inner fold edges of the separating medium 48 and of the support lattice 46 can rest on the radial outer circumferential side of a circular cylindrical separating unit support tube.

The coalescing medium 40, instead of being a nonwoven, can also be realized in a different way, for example, as a screen, woven fabric or granular material.

The filter medium 30, instead of surrounding in radial direction externally the coalescing medium 40 and the separating unit 44, 144, can also be arranged in the interior of the separating unit 44; 144. The diesel fuel to be purified flows then through the filter medium 30, the coalescing medium 40, and the separating medium 48, 148 from the interior to the exterior in radial direction.

The filter medium 30, the coalescing medium 40, and/or the separating medium 48, 148, instead of being axial to the filter axis 24, can also be arranged in a different way, for example, eccentrically to the filter axis 24.

While specific embodiments of the invention have been shown and described in detail to illustrate the inventive principles, it will be understood that the invention may be embodied otherwise without departing from such principles.

What is claimed is:

1. A water separating device of a filter element for separating water from a liquid hydrocarbon, the water separating device comprising:
    a cylindrical coalescing medium configured as a hollow body and adapted to coalesce water droplets contained in a liquid hydrocarbon passing through the coalescing medium in a flow direction of the liquid hydrocarbon;
    a star-folded hydrophobic separating medium having a plurality of fold ridges and fold pockets, the star-folded separating medium configured as a hollow body and permeable for the liquid hydrocarbon, the star-folded separating medium arranged in a flow direction of the liquid hydrocarbon downstream of the cylindrical coalescing medium and configured to separate water droplets contained in the liquid hydrocarbon from the liquid hydrocarbon;
    wherein the star-folded hydrophobic separating medium has a radial inner side and a radial outer side;
    a support lattice having a plurality of fold ridges and fold pockets received into the fold ridges and fold pockets of the separating medium, the support lattice arranged at and directly on the radial inner side of the separating medium;
an upper end disk arranged at a first axial end of the separating medium;
a lower separating end disk arranged at an opposite second axial end of the separating medium;
at least one precipitation gap formed between the cylindrical coalescing medium and the star-folded hydrophobic separating medium;
a shape-stabilizing support body is star-shaped having a plurality of fold ridges and fold pockets received into the fold ridges and fold pockets of both the star-folded separating medium and the support lattice, the shape-stabilizing support body arranged directly on and supporting the star-folded hydrophobic separating medium, the shape-stabilizing support body having through openings having a diameter in a range of between 100 μm to less than 6 mm;
wherein the star-folded hydrophobic separating medium having the support lattice is pushed onto the shape-stabilizing support body such that the support lattice is sandwiched between the star-folded hydrophobic separating medium and the shape-stabilizing support body;
wherein the star-folded hydrophobic separating medium comprises through openings for the liquid hydrocarbon and the through openings have a diameter or a width in a range from 0.1 μm to less than 3 μm;
wherein the shape-stabilizing support body has through openings for the liquid hydrocarbon;
wherein the star-folded hydrophobic separating medium is arranged directly on a radially outer side of the shape-stabilizing support body;
wherein a radially outer side of the shape-stabilizing support body has circumferential support sections conforming to and supporting the star-folded hydrophobic separating medium;
wherein the support lattice and the separating medium are connected to the upper end disk and/or connected to the lower separating end disk;
wherein the support lattice is a star-shaped support body having a plurality of zigzag folds.

2. The water separating device according to claim 1, wherein
the star-folded hydrophobic separating medium comprises polytetrafluoroethylene.

3. The water separating device according to claim 2, wherein
the star-folded hydrophobic separating medium comprises a porous medium layer comprised of said polytetrafluoroethylene.

4. The water separating device according to claim 3, wherein
the porous medium layer is a film or a membrane.

5. The water separating device according to claim 2, wherein
said polytetrafluoroethylene is a multi-directional polytetrafluoroethylene (ePTFE) in which the molecule fibers are oriented in different directions for added strength and creep resistance.

6. The water separating device according to claim 1, wherein
the star-folded hydrophobic separating medium has a circumferential side with an alternating course.

7. The water separating device according to claim 1, further comprising
a filter medium is a star-shape folded, circumferentially closed filter medium having radial inner fold edges and radially outer fold edges, the filter medium configured as a hollow body and adapted to filter the liquid fuel, wherein the filter medium is arranged in the flow direction of the liquid fuel upstream of the separating medium;
wherein the filter medium is arranged in the flow direction of the liquid hydrocarbon upstream of the star-folded hydrophobic separating medium.

8. The water separating device according to claim 7, wherein
the filter medium surrounds the star-folded hydrophobic separating medium.

9. The water separating device according to claim 7, wherein
the filter medium is arranged in an interior of the star-folded hydrophobic separating medium.

10. The water separating device according to claim 9, wherein
the star-folded filter medium is arranged in an interior of the star-folded hydrophobic separating medium;
wherein the water separating device is adapted to be arranged exchangeably in a housing having the filter medium, the water separating device exchangable separately from the filter medium and housing.

11. A filter element of a fuel filter of an internal combustion for filtration of a liquid fuel and for separation of water from the liquid fuel, the filter element comprising:
a water separating device comprising:
a cylindrical coalescing medium configured as a hollow body and adapted to coalesce water droplets contained in a liquid hydrocarbon passing through the coalescing medium in a flow direction of the liquid hydrocarbon;
a star-folded hydrophobic separating medium having a plurality of fold ridges and fold pockets, the star-folded separating medium configured as a hollow body and permeable for the liquid hydrocarbon, the star-folded separating medium arranged in a flow direction of the liquid hydrocarbon downstream of the cylindrical coalescing medium and configured to separate water droplets contained in the liquid hydrocarbon from the liquid hydrocarbon;
wherein the star-folded hydrophobic separating medium has a radial inner side and a radial outer side;
a support lattice having a plurality of fold ridges and fold pockets received into the fold ridges and fold pockets of the separating medium, the support lattice arranged at and directly on the radial inner side of the separating medium;
an upper end disk arranged at a first axial end of the separating medium;
a lower separating end disk arranged at an opposite second axial end of the separating medium;
at least one precipitation gap formed between the cylindrical coalescing medium and the star-folded hydrophobic separating medium; and
a shape-stabilizing support body is star-shaped having a plurality of fold ridges and fold pockets received into the fold ridges and fold pockets of both the star-folded separating medium and the support lattice, the shape-stabilizing support body arranged directly on and supporting the star-folded hydrophobic separating medium, the shape-stabilizing support body having through openings having a diameter in a range of between 100 μm to less than 6 mm;

wherein the star-folded hydrophobic separating medium having the support lattice is pushed onto the shape-stabilizing support body such that the support lattice is sandwiched between the star-folded hydrophobic separating medium and the shape-stabilizing support body;

wherein the star-folded hydrophobic separating medium comprises through openings for the liquid hydrocarbon and the through openings have a diameter or a width in a range from 0.1 μm to less than 3 μm;

wherein the shape-stabilizing support body has through openings for the liquid hydrocarbon;

wherein the star-folded hydrophobic separating medium is arranged directly on a radially outer side of the shape-stabilizing support body;

wherein a radially outer side of the shape-stabilizing support body has circumferential support sections conforming to and supporting the star-folded hydrophobic separating medium; and wherein the support lattice and the star-folded hydrophobic separating medium are connected to the upper end disk and/or connected to the lower separating end disk;

wherein the star-folded hydrophobic separating medium is adapted to separate water droplets contained in the liquid fuel;

a star-shape folded, circumferentially closed filter medium having radial inner fold edges and radially outer fold edges, the filter medium configured as a hollow body and adapted to filter the liquid fuel, wherein the filter medium is arranged in the flow direction of the liquid fuel upstream of the separating medium;

wherein the cylindrical coalescing medium is spaced radially away from the filter medium except at the radial inner fold edges of the filter medium where the coalescing medium rests directly on the radial inner fold edges of the filter medium;

at least one precipitation gap formed between the coalescing medium and the separating medium;

wherein the water separating device is adapted to be arranged exchangeably in a housing, the water separating device exchangable separately from the filter medium and housing.

12. The filter element according to claim 11, wherein the filter medium surrounds the separating medium.

13. The filter element according to claim 11, wherein the filter medium is arranged in an interior of the separating medium.

14. A fuel filter of an internal combustion engine, the fuel filter comprising:

a housing comprising at least one fuel inlet for liquid fuel to be purified, at least one fuel outlet for purified liquid fuel, and at least one water outlet for water separated from the liquid fuel;

a filter element according to claim 11, arranged in the housing such that the filter element sealably separates the at least one fuel inlet from the at least one fuel outlet such the fuel flowing from the at least one fuel inlet to the at least one fuel outlet is required to flow through the filter element.

15. The filter element according to claim 11, wherein the star-folded hydrophobic separating medium comprises polytetrafluoroethylene;

said polytetrafluoroethylene is a multi-directional polytetrafluoroethylene (ePTFE) in which the molecule fibers are oriented in different directions for added strength and creep resistance.

* * * * *